United States Patent [19]

Ellerbe, III et al.

[11] Patent Number: 4,696,976
[45] Date of Patent: Sep. 29, 1987

[54] VINYL URETHANE COMPOSITE POLYMER CONTAINING DISPERSED SOFT COPOLYMER PARTICLES

[75] Inventors: Gilbert B. Ellerbe, III; Donald B. Parrish, both of Lake Jackson, Tex.

[73] Assignee: The Dow Chemical Company, Midland, Mich.

[21] Appl. No.: 679,325

[22] Filed: Dec. 7, 1984

[51] Int. Cl.$^4$ .................... C08F 8/00; C08L 75/00
[52] U.S. Cl. ..................................... 525/126; 525/131
[58] Field of Search ................................ 525/126, 131

[56] References Cited

U.S. PATENT DOCUMENTS 4,125,487  11/1978  Olstowski ........................ 525/126
4,272,619   6/1981  Balle et al. ...................... 525/131

Primary Examiner—John C. Bleutge
Assistant Examiner—A. Carrillo

[57] ABSTRACT

Vinyl urethane composite polymers having improved impact strength are prepared by reacting a polymer polyahl containing dispersed soft polymer particles, a polyisocyanate and a vinyl monomer.

11 Claims, No Drawings

VINYL URETHANE COMPOSITE POLYMER CONTAINING DISPERSED SOFT COPOLYMER PARTICLES

BACKGROUND OF THE INVENTION

This invention relates to vinyl urethane composite polymers, more particularly to vinyl urethane composite polymers having improved impact strength.

Vinyl urethane composite polymers are known and disclosed in U.S. Pat. Nos. 4,098,733 and 4,125,487. These composites are prepared by the simultaneous polymerization of vinyl monomers and polyurethane-forming reactants in which the heat of reaction of the polyurethane-forming reactants initiates the polymerization of the vinyl monomers. Such composites exhibit advantages such as rapid curing and good tensile properties. Unfortunately, however, the impact strength and elongation of these composites are not as good as desired for some applications.

It would be desirable to provide a vinyl urethane composite polymer having improved impact strength and elongation properties, and which also largely retains the beneficial properties of previously known vinyl urethane composites.

SUMMARY OF THE INVENTION

This invention is a vinyl-urethane composite polymer which comprises a reaction product of a reaction mixture comprising (a) a copolymer polyahl containing dispersed soft polymer particles, (b) a polyisocyanate and (c) a vinyl monomer which has a boiling point above the temperature incurred in reacting said reaction mixture. These reactants are reacted in the presence of catalysts for the free radical polymerization of said vinyl monomer and for the polymerization of the polyurethane-forming reactants (i.e. those containing isocyanate and active hydrogen containing groups).

The composite polymer of this invention exhibits good tensile properties and rapid curing as do previously known vinyl-urethane composite polymers. In addition, the impact properties and elongation of the composite polymer of this invention are substantially improved as compared to the previously known composite polymers.

DETAILED DESCRIPTION OF THIS INVENTION

The vinyl-urethane composite polymer of this invention comprises the reaction product of (a) a polymer polyahl containing dispersed soft polymer particles, (b) a polyisocyanate, and (c) a vinyl monomer which has a boiling point above the temperature incurred in reacting said reaction mixture.

The polymer polyahl employed herein comprises a dispersion of discrete soft polymer particles in a continuous polyahl phase. Preferably, the polymer particles are stabilized by being grafted onto at least a portion of the polyahl molecules. The polyahl may be any polyfunctional compound having at least two active hydrogens such as are described more fully hereinafter.

Advantageously, at least a portion of the polyahl used in the polymer polyahl comprises a compound which contains terminal ethylenic unsaturation which is copolymerizable with the monomers employed to prepare the addition polymer particles. The use of such compounds in preparing polymer polyahls is well known and described, for example, in U.S. Pat. Nos. 4,390,645 and 4,394,491. Typically, such ethylenically unsaturated compounds are prepared by reacting a portion of the polyahl with a difunctional reactant having polymerizable ethylenic unsaturation and a group which reacts with an active hydrogen-containing compound to form a linkage thereto. Suitable such compounds include ethylenically unsaturated acids, acid anhydrides, oxiranes, isocyanates and the like. Suitable ethylenically unsaturated acids include acrylic acid, methacrylic acid, fumaric acid, maleic acid and the like. Suitable ethylenically unsaturated acid anhydrides include maleic anhydride, fumaric anhydride and the like. Ethylenically unsaturated oxiranes suitable herein include glycidyl acrylate, glycidyl methacrylate, allyl glycidyl ether, and the like. Ethylenically unsaturated isocyanates useful herein include isopropenyl isocyanate, vinyl isocyanate, isocyanatoethylmethacrylate, and the like. Methods of preparing such compounds are described in the aforementioned patents.

Alternatively, an adduct can be prepared by reacting a portion of the polyahl with a polyisocyanate for form an adduct having free isocyanate groups, and then reacting the adduct with an ethylenically unsaturated active-hydrogen containing compound such as hydroxyethylacrylate, hydroxyethylmethacrylate, aminoethyl acrylate, aminoethylmethacrylate, and the like.

Also suitable are mono-adducts of a polyether polyol and an isocyanatoalkyl ester of acrylic or methacrylic acid, as described in U.S. Pat. No. 4,394,491 to Hoffman et al.

Advantageously, the polyahl contains from about 0.002 to about 50, preferably about 0.02 to about 5, equivalents of ethylenically unsaturated terminal groups per active hydrogen equivalent.

Preferably, the dispersed soft polymer particles comprise an addition polymer. The addition polymer particles are prepared by polymerizing at least one ethylenically unsaturated monomer in the presence of said polyahl. The preparation of polymer polyahls is well known in the art and is taught for example in RE 28,118 and U.S. Pat. No. 4,233,425. In general, the polymerization is a thermally-induced free radical polymerization performed in the presence of a free radical-forming catalyst such as benzoyl peroxide, t-butyl perbenzoate, t-butyl peroxide, azobisisobutyronitrile, mixtures thereof and the like. The monomers employed herein are such that the dispersed polymer particles of the polymer polyahl are "soft" polymers. By "soft", it is meant that the dispersed polymer particles are substantially more elastomeric (i.e. have a higher elongation) than the polyurethane/polyvinyl matrix formed by the reaction of the polyahl, isocyanate and vinyl monomers employed in the reaction mixture. The dispersed soft polymer particles preferably have a glass transition temperature ($T_g$) which is lower than the temperature at which it is employed. More preferably, the $T_g$ of the dispersed polymer particles is less than about 20° C., most preferably less than 0° C. Exemplary monomers include, for example, styrene, vinyl naphthylene, t-butyl styrene divinylbenzene, α-methyl styrene, acrylonitrile, butadiene, vinyl chloride, vinylidene chloride, and esters of acrylic methacrylic acids, including ethylacrylate, n-, o-, or sec-butyl acrylate, n-, o-, or sec-butylmethacrylate, dicyclopentadienemethacrylate, hydroxyethyl acrylate, hydroxyethyl methacrylate, methyl acrylate, methyl methacrylate and the like. Such monomers are polymerized in situ in the polyahl to form polymer particles dispersed within or, in preferred embodiments, grafted to the continuous polyahl phase. It is noted that certain of the foregoing monomers, if homopolymerized, tend to provide hard, i.e. high $T_g$, polymers. The use of these monomers in this invention is in conjunction with one or more "soft" monomers, in particular the acrylic monomers, so that the resulting copolymer particles are "soft", as defined herein.

The polyahl employed as the continuous phase of the polymer polyahl is a polyfunctional compound having at least two hydrogens which display significant activity according to the Zerewitnoff test described by Kohler in the Journal of the American Chemical Society Vol. 49, page 3181 (1927). Typically, the polyahl is a polyol, polyamine, polyamide, polymercaptan, polyacid or a compound containing a mixture of said groups. Preferred are polyols and amine terminated polyethers as are described in U.S. Pat. No. 3,654,370.

Of these, the polyether polyols are most preferred. Such polyether polyols are advantageously prepared by reacting a $C_2$–$C_6$ alkylene oxide, preferably $C_2$–$C_4$, alkylene oxide, more preferably propylene oxide or mixtures thereof with ethylene oxide, with a polyfunctional initiator compound having a plurality of active hydrogen atoms. Preferably, the polyether polyol has a molecular weight from about 200–8000, more preferably about 1000–6000, although mixtures thereof with lower molecular weight polyahls are also useful.

Also useful herein are polymer polyahls having dispersed polyurethane particles as are described in U.S. Pat. No. 4,347,209 to Rowlands, as well as the so-called "PHD polyols" as described in U.S. Pat. No. 4,042,537.

The use of a polymer polyahl herein provides improvement in elongation and impact strength. In general, the polymer polyahl is employed in an amount such that such improvement is seen. Typically, the dispersed particles of the polymer polyahl comprise from about 1 to about 20, preferably from about 3 to 12, more preferably from about 4 to 8 percent by weight of the combined weight of all reactive components employed in preparing the vinyl urethane composite.

Generally, polymer polyahls are prepared with a dispersed polymer particle (solids) content of about 5–50% by weight. It is readily seen that in order to provide the desired concentration of soft polymer particles in the composite, it may be necessary or desirable to dilute the polymer polyahl with additional polyahl. Such polyahl is suitably as described hereinbefore with respect to the polymer polyahl.

The polyisocyanate preferably has a functionality from about 2 to about 5. The polyisocyanate may be aliphatic or, preferably, aromatic. Suitable aliphatic isocyanates include 1,6-hexamethylenediisocyanate, 1,4-cyclohexanediisocyanate, 1,4-bis(isocyanatomethyl)- cyclohexane, hydrogenated derivatives of aromatic polyisocyanates as described hereinafter, mixtures thereof and the like.

Suitable aromatic polyisocyanates include, for example 2,4-toluene diisocyanate, 2,6-toluene diisocyanate, p,p'-diphenylmethanediisocyanate, p-phenylene diisocyanate, naphthylene diisocyanate, polymethylene polyphenyldiisocyanates, mixtures thereof and the like. Isocyanate-erminated prepolymers or quasiprepolymers, formed by the reaction of a polyahl and a substantial excess of a polyisocyanate are also useful.

Suitable polyahls include those listed in columns 3–5 of U.S. Pat. No. 4,394,491. Preferred, however, are the polyols. Examples of such polyols are the polyol polyethers, the polyol polyesters, hydroxy functional acrylic polymers, hydroxyl-containing epoxy resins, polyhydroxy-terminated polyurethane polymers, polyhydroxyl-containing phosphorus compounds and alkylene oxide adducts of polyhydric thioethers including polythioethers, acetals including polyacetals, polyalkylene carbonate polyols, aliphatic and aromatic polyols.

The amount of polyisocyanate employed is generally such that the reaction mixture contains an isocyanate index of about 90–150. The isocyanate index is 100 times the number ratio of isocyanate groups to active hydrogen atoms in the reaction mixture.

The addition polymerizable monomer employed herein is one which has a boiling point above the temperatures encountered in the polymerization of the reaction mixture to form the vinyl urethane composite. Preferably, the addition polymerizable monomer has an atmospheric boiling point of at least 70° C., and more preferably at least 100° C. Lower boiling monomers tend to volatilize during the reaction of the reaction mixture, forming cells or voids in the product vinyl urethane composite. The monomer also preferably contains no groups which are reactive with isocyanates. Suitable monomers include, for example, styrene, divinylbenzene, 2-ethylhexylacrylate, butyl acrylate, t-butyl styrene, trimethylolpropane trimethacrylate, 1,3-butylene glycol dimethacrylate, vinyltoluene, chlorostyrene, methyl methacrylate, methylacrylate, propylacrylate, propylmethacrylate, vinyl benzene, butyl methacrylate, hexyl methacrylate, hexyl acrylate, vinyl naphthalene, vinylcyclohexane, vinyl acetate, vinyl sulfone, and the like. Liquid monomers are preferred, but solid monomers can be used if dissolved in another monomer or other components present in the reaction mixture.

The vinyl monomer advantageously comprises about 15 to 75% by weight of the reaction mixture, preferably about 20 to 60% by weight thereof.

The polymerization of the reactants is advantageously carried out under conditions such that the polyahls and isocyanates react more or less simultaneously with the reaction of the vinyl monomers. The general conditions described in U.S. Pat. No. 4,125,497 are suitable herein. In general, a polymerization temperature from about 0° to 180° C., preferably from 20° to 120° C. is employed. Typically, the reaction is carried out in the presence of a catalyst for the reaction of the isocyanate and active hydrogen-containing compounds as well as one for the polymerization of the vinyl monomers. The conventional urethane catalysts are useful as catalysts herein. Preferred are organolead catalysts such as lead salts of carboxylic acids having from about 2 to about 20 carbon atoms, including, for example, lead octoate, lead oleate, lead naphthenate and mixtures thereof and the like. Also preferred are cobalt, vanadium and copper catalysts as described in U.S. Pat. No. 4,125,487. Catalysts for polymerizing the ethylenically unsaturated monomers include those described hereinbefore in conjunction with the preparation of the polymer polyahl.

Due to the presence of the polymer polyahl it is not generally necessary to employ a diluent or reaction modifier to form the vinyl urethane composite polymer of this invention. However, in cases wherein a highly exothermic reaction is obtained, or it is otherwise necessary to disperse the heat of reaction, a diluent or reaction modifier may be employed herein. Such diluent or reaction modifier is most commonly required when the heat of reaction is so great that one or more of the components of the reaction mixture undesirably volatilizes or degrades during the polymerization reaction. Suitable diluents are described in U.S. Pat. No. 4,125,487 and include, for example, organic liquids having a boiling point of at least 150° C., granular solids having a surface area of less than about 0.8 mz/g, and addition polymers having a grease melt index from about 1 to about 250 grams per minute as determined with a 0.02 inch orifice employing a total weight of 2160 grams at 80° C., a solubility parameter of at least about 8 and a specific heat of at least about 0.35 calories/g/° C. The diluent or reaction modifier, when required, is employed in an amount that the exotherm from the urethane-forming reaction is controlled such that substantially no undesirable volatilization or degradation of the components of the reaction mixture occurs, but in an amount less than that which inhibits the polymerization of the addition polymerizable reactants.

Various optional components may be employed herein. For example, if a cellular composite is desired, a blowing agent such as water or a low boiling halogenated organic compound, such as chloroform, trichloroethane, methylene chloride, trichlorofluoromethane, dichlorodifluoromethane and the like may be employed herein. Other useful blowing agents include substances which thermally decompose to form carbon dioxide or water vapor under the reaction condition such as magnesium sulfate heptahydrate, sodium carbonate decahydrate, sodium phosphate dodecehydrate, calcium nitrate tetrahydrate, ammonium carbonate tetrahydrate, and the like.

In addition, surfactants, i.e. cell size control agents, antioxidants, pigments, inorganic fillers, dyes, chain transfer agents, and other commonly employed additives may be employed herein for their usual purposes.

The shaping or forming of the vinyl urethane composites of this invention may be accomplished by pouring the reactants into molds made of substances such as polyethylene, polypropylene, polyethylene terephthalate, silicone elastomers, metals such as aluminum, copper or alloys such as brass or stainless steel. The mold must be such that it can withstand the heat generated by the polymerizing mass and also must be nonreactive with and insoluble in the reactants. To prevent the reacting mass from adhering to the mold surface, it may be necessary to precoat the mold surface with a film of an external mold release such as a hydrocarbon wax, a polysilicone preparation or a polytetrafluoroethylene coating. Alternatively, one may employ an internal mold release in the composition. An especially suitable internal mold release agent comprises an amine-initiated polyol and zinc, nickel or copper salts of fatty acids, especially zinc dilaurate.

The reactants may be introduced individually into the mold but preferably are introduced into the mold in as few streams as possible. Preferably, the reactants are placed in the mold in two streams, one of which contains the polymer polyahl and catalysts and the second of which contains the remainder of the reactants. Alternatively, of the preferred two streams one may contain the polymer polyahl and free radical initiator, and the second may contain the urethane catalyst and the polyisocyanate.

The reaction mixture is suitable for processing in reaction injection molding (RIM) processes as well as conventional coating processes. Exemplary RIM processes are described in Ludwice and Taylor, The Bayflex 110 Series. —The New Generation of RIM Materials, presented at the Society of Automotive Engineers Passenger Car meeting, Detroit Mich., September 26–30, 1977, British Pat. No. 1,534,258, and Sweeney, *Introduction to Reaction Injection Molding*, Technomics, Inc. 1979.

In conducting the reaction via RIM or conventional casting processes an elevated temperature, i.e. 60°–100° C., preferably 70°–95° C. is advantageously used to effectuate the polymerization reactions. Significantly lower temperatures do not provide an economical rate of reaction, whereas higher temperatures often cause the reaction to proceed too rapidly, or cause the degradation or undesirable volatilization of components in the reaction mixture.

The composite polymer of this invention is useful in preparing shaped elastomeric materials such as furniture components, piping elements, machine components, structural member and the like.

The following examples are provide to illustrate the invention and are not intended to limit the scope thereof. All parts and percentages are by weight unless otherwise indicated.

EXAMPLE 1

A. Preparation of Copolymer Polyol

To a glass reactor are added 420 grams of a 2000 molecular weight polypropylene glycol, 10 parts per million of a monomethyl ether of hydroquinone and about 2 drops of dibutyltin dilaurate catalyst. This mixture is heated to 70° C. and 6.5 g isocyanatomethylmethacrylate is added to the reactor. This reaction is heated at 70° C. for 2 hours at which time a vinyl terminated adduct having the following average structure is obtained:

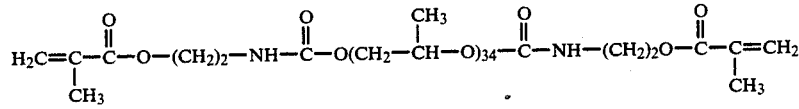

The reactor is purged with nitrogen and a mixture of 345 grams of n-butylacrylate and 115 grams of acrylonitrile, and a mixture of 661 grams of a 2000 molecular weight polypropylene glycol and 9 grams of azobisisobutyronitrile are simultaneously added dropwise to the reactor over a period of one hour. The reaction temperature is increased to 100° C. during the initial 5 minutes of the addition of these reactants. After all reactants are added, the temperature is maintained at 100° C. for 2 more hours. The product is recovered is an opaque mixture of particles with a hydroxyl equivalent weight of about 1500. The product contains about 56.9% by weight of dispersed polymer particles (exclusive of vinyl-terminated adduct). The dispersed particles contain about 39 parts by weight n-butyl acrylate, 12.9 parts by weight acrylonitrile and 48.1 parts by weight of the vinylterminated adduct.

B. Preparation of Copolymer Polyol B

To a glass reactor are added 800 grams of a 260 molecular weight poly(propylene oxide) triol, 10 ppm of a monomethyl ether of hydroquinone and about 2 drops of dibutyltindilaurate catalyst. This mixture is heated to 70° C. and 47.7 g of isocyanatoethylmethacrylate (IEM) is added to the reactor. The reaction temperature is maintained at 70° C. for two hours. At this time, the poly(propylene oxide) triol is 10% capped with the IEM.

A 300-gram portion of the capped triol is placed under a nitrogen atmosphere in a glass reactor and heated to 100° C. A mixture of 46 grams n-butyl acrylate and 46 grams acrylonitrile is gradually added to the reactor over a ten-minute period. Then, a second mixture of 299 grams n-butyl acrylate and 69 grams acrylonitrile is added over a 55 minute period. During these additions, a mixture of 661 grams of the triol and 9.2 grams azobisisobutyronitrile is added to the reactor over a 65 minute period. The temperature of the reaction mixture is then reduced to 80° C. for 16 hours, after which the product is recovered. The product contains 33.6% by weight dispersed polymer particles (including the IEM triol adduct). These particles contain 66.5% n-butyl acrylate, 22.2% acrylonitrile and 11.3 IEM/triol adduct.

EXAMPLE 2

Vinyl composite Sample No. 1 is prepared from the following components:

| Component | Parts by weight |
| --- | --- |
| 260 MW poly(propylene oxide)triol | 48.0 |
| Copolymer polyol A | 9.7 |
| Vinyl toluene | 60.0 |
| 143 equivalent weight liquid MDI | 80.0 |
| t-butyl perbenzoate | 0.4 ml |
| lead octoate (24% active) | 1.0 |
| cobalt naphthenate (12% active) | 0.15 |

All components except the isocyanate are hand mixed at room temperature. The isocyanate is then added, stirred in for 10–15 seconds and the reaction mixture is poured with an insulated ⅛" deep aluminum mold which has been preheated to 90° C. The molding is removed from the mold as a rigid part after 4 minutes. The tensile and flexural properties of the molding are determined on an Instron machine using ASTM-D638 and D-790. The 264 psi heat distortion temperature is determined using ASTM D -648. The Gardner impact strength is determined according to ASTM D-329. The results are reported in Table I following:

In like manner, vinyl composite Sample No. 2 and Comparative Samples A, B and C are prepared from the following formulations. Of these, Comparative Sample No. A is a direct comparison to Sample No. 1, having the same types and amounts of polyols as used in Sample No. 1. Comparative Sample No. B is a direct comparison to Sample No. 2. Comparative Sample No. C is an attempt to improve elongation and impact strength by the addition of a particulate solid.

| Component | Sample No. (parts by weight) | | | |
| --- | --- | --- | --- | --- |
| | 2 | A | B | C |
| 260 MW triol | 36 | 50.3 | 53 | 48 |
| 2000 MW poly(propylene oxide) diol | — | 6 | — | — |
| Copolymer polyol B | 20 | — | — | — |
| Vinyl toluene | 60 | 60 | 60.1 | 60 |
| 143 equivalent weight liquid MDI | 81.7 | 83.7 | 87.1 | 80 |
| silica gel | — | — | — | 9.7 |
| t-butyl perbenzoate (cc) | 0.4 | 0.4 | 0.4 | 0.4 |
| lead octoate (24% active) | 1.0 | 1.0 | 1.5 | 1.0 |
| cobalt naphthenate (12% active) | 0.15 | 0.15 | 0.15 | 0.15 |

Table I contains the results of the testing of the various Samples and Comparative Samples.

| Test | Sample No. | | | | |
| --- | --- | --- | --- | --- | --- |
| | 1 | A* | 2 | B* | C* |
| Tensile Strength (psi) | 8,022 | 8,246 | 8,927 | 10,600 | 4,359 |
| Elongation (%) | 20 | 16.75 | 17.75 | 15.5 | 2.5 |
| Flexural Modulus (psi) | 369,500 | 369,303 | 358,993 | 439,265 | 163,331 |
| Gardner Impact Strength (in/lb) | 64 | 28 | 32 | 22 | 20 |
| Specific Gravity (g/cc) | 1.1506 | 1.1541 | 1.1571 | 1.1582 | 1.1707 |
| Heat distortion temperature (°F.) (264 psi) | 160 | 154 | 190 | 174 | 151 |

*Not an example of this invention.

Comparative Sample No. B represents prior art composites. Comparative Sample No. A represents an attempt to provide a high tensile strength composite having good impact strength by using a high molecular weight diol as part of the polyol formulation. However, the impact strength of Comparative Sample No. A is only about half that of Sample No. 1. Sample No. 2 does not contain any diols and accordingly has somewhat lower elongation and impact strength than Sample No. 1. However, both of these properties are significantly greater than the direct prior art comparison, Comparative Sample No. B. In addition, the heat distortion temperature of Sample No. 2 is 16° higher than that of Comparative Example No. B. Comparative Sample No. C is an attempt to improve impact properties by the use of silica gel. No improvement in impact is seen.

We claim:

1. A vinyl urethane composite polymer comprising the reaction product of a reaction mixture comprising
   (a) a polymer polahl containing dispersed soft polymer particles, which dispersed particles have a $T_g$ of less than 20° C.,
   (b) a vinyl monomer having a boiling point above the temperature incurred in reacting said reaction mixture, and
   (c) a polyisocyanate.

2. The composite of claim 1 wherein the polymer polyahl comprises a polyether polyol having a molecular weight of about 200–8000 having a plurality of addition polymer particles dispersed therein.

3. The composition of claim 2 wherein the dispersed polymer particles comprise a polymer of an ester of acrylic or methacrylic acid or mixtures thereof.

4. The composite of claim 2 wherein the dispersed polymer particles comprise a polymer of acrylonitrile.

5. The composite of claim 2 wherein the dispersed polymer particles comprise a polymer of butadiene.

6. The composite of claim 2 wherein the addition polymer particles are grafted onto a portion of the polyahl which contains terminal ethylenic unsaturation.

7. The composite of claim 2 wherein the vinyl monomer comprises styrene, vinyl toluene, vinyl naphthylene, chlorostyrene, t-butyl styrene, α-methyl styrene, acrylonitrile or mixtures thereof.

8. The composite of claim 1 wherein the reaction mixture further comprises a free-radical initiator and a catalyst for the reaction of a polyisocyanate and a polyahl.

9. The composite of claim 8 wherein the catalyst for the reaction of a polyisocyanate and a polyahl comprises a lead, cobalt, vanadium or copper catalyst.

10. The composite of claim 1 wherein said vinyl monomer comprises about 15 to about 75% by weight of the reaction mixture.

11. The composite of claim 7 wherein said vinyl monomer comprises about 20 to about 60% by weight of the reaction mixture.

* * * * *